(12) United States Patent
Block et al.

(10) Patent No.: US 9,572,359 B2
(45) Date of Patent: Feb. 21, 2017

(54) DEVICE AND METHOD FOR ROTATION OF CONFECTIONERY

(71) Applicants: Chuck Block, Chula Vista, CA (US); Dan Blanchard, Chula Vista, CA (US)

(72) Inventors: Chuck Block, Chula Vista, CA (US); Dan Blanchard, Chula Vista, CA (US)

( * ) Notice: Subject to any disclaimer, the term of this patent is extended or adjusted under 35 U.S.C. 154(b) by 174 days.

(21) Appl. No.: 14/617,821

(22) Filed: Feb. 9, 2015

(65) Prior Publication Data
US 2015/0150278 A1 Jun. 4, 2015

Related U.S. Application Data

(63) Continuation-in-part of application No. 13/401,812, filed on Feb. 21, 2012, now Pat. No. 8,951,588.

(60) Provisional application No. 61/444,610, filed on Feb. 18, 2011.

(51) Int. Cl.
*A23G 3/56* (2006.01)

(52) U.S. Cl.
CPC ........... *A23G 3/563* (2013.01); *A23V 2002/00* (2013.01)

(58) Field of Classification Search
CPC ...................................... A23G 3/563
USPC .......................... 426/104, 134; D21/458, 461
See application file for complete search history.

(56) References Cited

U.S. PATENT DOCUMENTS

| | | | | |
|---|---|---|---|---|
| 2,721,141 A | * | 10/1955 | Leinhauser | A23G 3/563 294/5.5 |
| 3,140,954 A | * | 7/1964 | Schroeder | A63H 27/12 426/104 |
| D246,207 S | * | 11/1977 | Dee | 426/104 |
| 4,582,497 A | * | 4/1986 | Lyons | A63H 33/40 446/217 |
| 5,957,746 A | * | 9/1999 | Diamond | A23G 3/50 446/236 |
| 6,077,144 A | * | 6/2000 | Fishman | A23G 3/50 40/442 |
| 7,093,832 B2 | * | 8/2006 | Parker | A47G 19/025 273/236 |
| 7,211,282 B2 | * | 5/2007 | Straus | A23G 3/50 426/104 |
| 2002/0185398 A1 | * | 12/2002 | Price | A23G 3/563 206/389 |

\* cited by examiner

*Primary Examiner* — Erik Kashnikow
*Assistant Examiner* — Chaim Smith
(74) *Attorney, Agent, or Firm* — Donn K. Harms

(57) ABSTRACT

A hand-held candy device for rotational engagement of a confectionery such as a sucker or lollipop at the distal end of a handle adapted for gripping by the fingers of a user. The candy sucker is rotationally engaged on an axle positioned at or adjacent to the distal end of the handle. The candy may be provided in multiple colors and flavors or with indicia thereon in candy components each of which is engageable to the axle on the handle by a user thereby providing users with the ability to customize and reuse the sucker handles and to spin the engaged candy once engaged to the axle for amusement or to allow tasting different sections of the unitary formed candy which have different flavors.

6 Claims, 9 Drawing Sheets

DEVICE AND METHOD FOR ROTATION OF CONFECTIONERY

This application is a Continuation-in-Part application from U.S. patent application Ser. No. 13/401,812 filed on Feb. 21, 2012 which claims priority to U.S. Provisional Patent Application No. 61/444,610 filed on Feb. 18, 2011, both of which are respectively incorporated in their entirety by this reference hereto.

BACKGROUND OF THE INVENTION

1. Field of the Invention

The present invention relates to confectioneries. More particularly, it relates to a confectionery sucker device configured to allow the user to rotate the hard candy confectionery in a manner similar to a pinwheel and to change the flavor or color of the confectionery being eaten through a novel mounting system, and to play games using the spinning hard candy as a game wheel.

2. Prior Art

Lollipops and confectioneries of the like are conventionally presented to consumers in a stationary fashion engaged upon sticks and the like. This positioning at the distal end of an elongated member or stick allows the confectionery to be easily consumed and is effectively presented to the consumer in a sanitary manner since there is no need to handle the confectionery directly. For hard candy suckers, which conventionally are consumed over a long time period by continual tongue and mouth contact with the candy, such a positioning of the sticky candy upon a stick alleviates the need for the user to touch the sticky and usually-colored candy with their hands during the long period of ingestion and enjoyment of the candy.

In addition to these advantages, such a presentation further allows the confectionery product to stand out and capture the attention of the consumers. Efforts to further gain the attention of youngsters and candy lovers alike, and to enhance their fun and therefore sales, have been made through novel combinations with toys or motion devices.

U.S. Pat. No. 7,211,282 to Straus et. al. teaches a pinwheel lollipop comprising a central hub about a central axis. To the hub are connected a plurality of protrusions such as individual candies, which are mounted on protrusions extending radially on fan like members from the hub.

Small individual candy items are attached to the distal ends of the plurality of extending members and may be licked by the user. However, the device of Straus focuses on the rotational element insofar as there are many formed plastic parts and components which allow for mechanical rotation of the wheel and candies using a motor in one instance. The confectionery component is secondary and the desirability of the device to youngsters or candy lovers is considerably less. Neither is there any means for users to reuse or assemble the device of Straus using other candies, nor to rotate the candy using their tongue as the geared engagement of the wheel of Straus discourages an easy rotation using the mouth or tongue of the user.

Other rotating candy dispensing devices are taught such as US publication 20050031746 to Johnson teaches a similar rotating assembly which positions one or sequential individual pieces of edible material about the circumference. Additionally US Publication 20020185398 to Price, teaches a rotating spool dispensing apparatus upon which elongated candy such as licorice is mounted. The rotation allows elongated sections of candy to un-spooled and bitten off by the user.

However, none of the prior art teaches or suggest positioning a large hard candy sucker upon a stick-engaged axle to allow the user to rotate the hard candy with their tongue for fun, and to reposition a new portion of the candy for subsequent licking, nor can the rotating hard candy be employed as a game.

As such, there is a continuing and unmet need for a confectionery sucker device which is low cost and easily assembled for use and enjoyment by the consumer. Such a device should have a spinning component mount employed in combination with a planar wheel shaped hard candy element, which will provide both a fun experience and if desired, the ability to reposition the stick-engaged hard candy for consuming a different portion or flavor thereof, and the ability to change or substitute the rotationally engaged hard candy element to new flavors or styles. Such a device, through the employment of a unitary formed rotating candy component, should be easily rotated by a contact with the tongue or mouth of the user and should continue to rotate once spun by the user's tongue. Further, such a device should advantageously be providable to the consumer as a unit already engaged with the rotating hard candy planar wheel, or as a group of individual components which the consumer may match to one, or any one of a group of rotationally engageable hard candies, so as to assemble their own favored flavor and color to rotate on the distal end of the stick provided in a focus on a novel consumable confectionery element. Still further, for fun and for various holidays, such a device should be providable with indicia upon one or both side surfaces of the planar hard candy, to allow users to play a game using the spinning hard candy as the game component.

SUMMARY OF THE INVENTION

The device and method herein disclosed and described provides a solution to the shortcomings in prior art and achieves the above noted goals of easy and continued tongue-powered rotation and the ability for custom assembly by the user through the provision of a rotating confectionery device resembling a pinwheel. The components of the device render it providable as an assembled unit, read for consumption, or as a kit which is easily assembled by a consumer or user to yield a customized rotating hard candy sucker. Thus, it may be sold in either manner or sold originally assembled with additional hard candy rotatable suckers being made available for subsequent user-assembly.

The device generally includes an elongated member forming a handle with a proximal end adapted for hand or finger engagement and the distal end having a horizontally disposed axis of rotation. In a particularly preferred mode, the axis of rotation is substantially perpendicular to the axis of the handle from which it extends. This allows for a rotation of the hard candy in a plane parallel to that of the elongated member which is adapted to be held by the user in a substantially vertical position.

The axle on which the hard candy is positioned is configured for easy user assembly and disassembly to allow subsequent user configurations. The device as such, provides the elongated member or stick configured to further support a hub that is configured to rotationally cooperatively engage to a pre-formed confectionery, or if no hub is employed then to the center of the hard candy confectionery itself.

The hub in a preferred mode, generally comprises a first and second circular planar surface. The surfaces employ annular portions forming central apertures which are coaxially aligned and engaged, and are communicating and extending therebetween at a distance relative to the thickness of the confectionery.

The confectionery, in a particularly preferred mode, is formed of a hard candy having a centered circular aperture sized to coaxially and operatively rotationally engage the hub. Tolerance for the components so engaged is sufficiently loose to ultimately rotate when accelerated by the force of contact of the tongue of the user contacting the candy.

The aperture formed in the confectionery may alternatively provide the means for engagement to the axis for rotation without the need for the hub portion. The aperture may further engage a friction enhancing bearing or similar friction reduction means to enhance spinning of the hard candy confectionery when accelerated by contact with the user's tongue or mouth, and to also provide a means for enhanced rotational engagement with the axis on which the confectionery rotates so as to allow the confectionery to continue to rotate when contact with the body of the user ceases.

While it is preferred that the confectionery be engaged to a free-wheel and easily rotate during any subsequent contact with the tongue and mouth of the user, it is envisioned that the device may employ a motor or other means to rotate the confectionery about the axis of rotation as an option.

The device preferably provides a means to rotate the confectionery while being held by a consumer which is easily assembled so as to allow use and subsequent assembly and disassembly by small children. This ease of assembly is provided through the employment of two snap-together components with sufficient resiliency to allow easy assembly on repeated occasions.

The confectionery is preferably formed to resemble a pinwheel or buzz saw, as well as a wide variety of other rotational forms which have color which changes during rotation. Thus, it is within the scope of the invention to provide the confectionery in a variety of colors and flavors thereby providing a user or consumer with a wide variety of choices upon initial purchase and subsequent purchases of replacement confectioneries.

The device can be configured to allows user to assemble the device themselves in a store or from a kit having multiple hard candy confectioneries each of which are configured to be engageable to the axle engageable in the elongated member providing the handle. Further, indicia can be placed upon or engaged to one or both side surfaces of the hard candy sucker to allow it to be employed as a game component. The indicia can have seasonal messages, game instructions, point counts, or may be holiday related such as for use on a holidays such as Valentine's day for fun.

As such, a low cost assembled or easily assembled confectionery device is provided for enjoyment by the consumer and if desired, allows the consumer to customize their spinning sucker with the color and flavor of choice on a given day by picking a confectionery with the desired qualities from the plurality available at home, or at candy stores where they may be sold pre-configured to rotate on the axis or axle of the handle. Further, the confectionery device can include spinning hard candies having indicia thereon or engaged thereto for use as a game component for a game of chance where the indicia aligns with a point on the handle or axis of the handle to designate a point count, player task or direction, or other steps to be taken by one or more players of the game.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide a hand held device for rotation of a confectionery that is lightweight, low cost, and easily assembled and disassembled.

It is another object of the invention to provide such a device which allows young and adult users to replace the individual spinning confectionery on their stick or handle with a plurality of different flavored or shaped confectionery components in the provided kit or sold subsequently at stores.

Another object of the invention is the provision of a hub component for cooperative engagement with an axis of rotation and confectionery to allow the user to keep the hard candy on a handle, but move it to consume a different portion or flavor.

Yet another object of the invention is the provision of an easily rotatable hard candy confectionery so as to allow rotational power to be provided by the user's tongue or mouth and to allow a continued spinning after contact with the user has ceased.

Yet another object of the invention is the provision of handle engaged rotating candy which may be employed for fun or game purposes using indicia positioned on one or both side surfaces of the rotating hard candy wheel.

BRIEF DESCRIPTION OF DRAWING FIGURES

DETAILED DESCRIPTION OF THE PREFERRED EMBODIMENTS OF THE INVENTION

Figure 1:
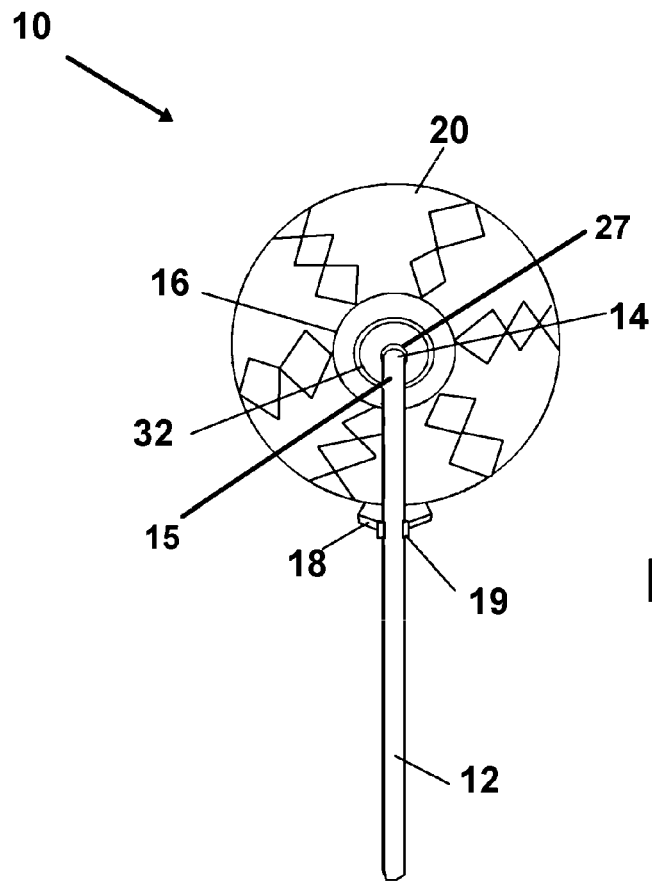
FIG. 1 shows front view of the device with confectionery.

Now referring to drawings in FIGS. 1-11, wherein similar components are identified by like reference numerals, there is seen in FIG. 1 a frontal or top plan view of the device 10. A first end 15 of the handle 12 distal from the held end and proximate to the confectionery 20, extends at a substantially 90 degree angle from the axis of the handle 12. This short extension of the first end 15 forms an axle providing the axis of rotation 14 for any confectionery 20 or such as a hard candy sucker, to be engaged thereon. This can more clearly be seen in the exploded view of FIG. 4 and that of FIG. 7 described shortly. Alternatively, the axis of rotation 14 may be separate than the handle and engaged to the handle by other engagement means such as adhesive, welding, frictional engagement, or the like. This is depicted in FIG. 4a, where the axis of rotation 14 is part of the hub which engages upon the distal end of the handle 12.

Figure 1A:
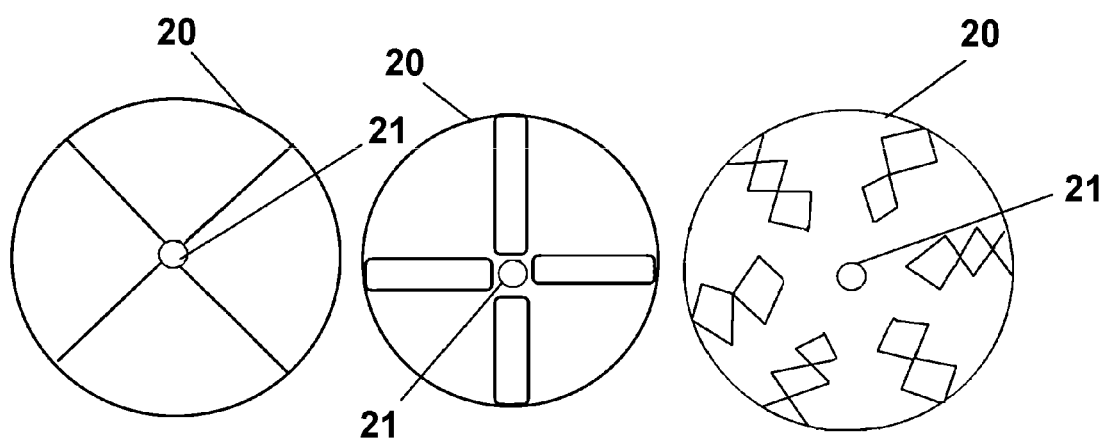
FIG. 1a shows a front view of a kit showing a plurality of the confectioneries and depicting an aperture employed to operatively engage any of the group to the axis of rotation.

The important factor is to keep the assembly simple so that a child or adult may assemble and disassemble it and engage and disengage the confectionery 20 of choice from the many made available from a group such as those depicted in FIG. 1a. As shown in 1a, the round confectionery 20 may be formed of different colors or patterns which may in fact be of candy portions having different flavors. As depicted, one confectionery 20 is in quadrants which may be of different colors, for example, and the colors may be different flavors. A spinning of such a confectionery 20 will cause a blending of the colors to render the confectionery 20 in a single different color formed by the mix of colors. Also shown are stripes with four triangular areas between them and a confetti pattern. These depictions are not to be limiting but are to show that the confectionery 20 can be any color, flavor, or size users might wish to buy from a kit of available confectioneries 20 sold at candy stores or provided with the handle 12 thereby allowing the handle 12 to be reused and reconfigured to the confectionery 20 taste of the user.

The spinning of the confectionery 20 on the axle formed by the axis of rotation 14, when in the as-used position shown in FIG. 1, is easily accomplished by the user using their tongue or mouth to start rotation because the ball 21 is sized to allow such a freewheel rotation during and after contact and rotational motion being imparted by a user's oral manipulation. Further, as shown in FIG. 1a, the size of the confectionery 20 may vary so as to have smaller sized confectionery 20 candies for small children or adults not wishing a larger one.

Figure 2:
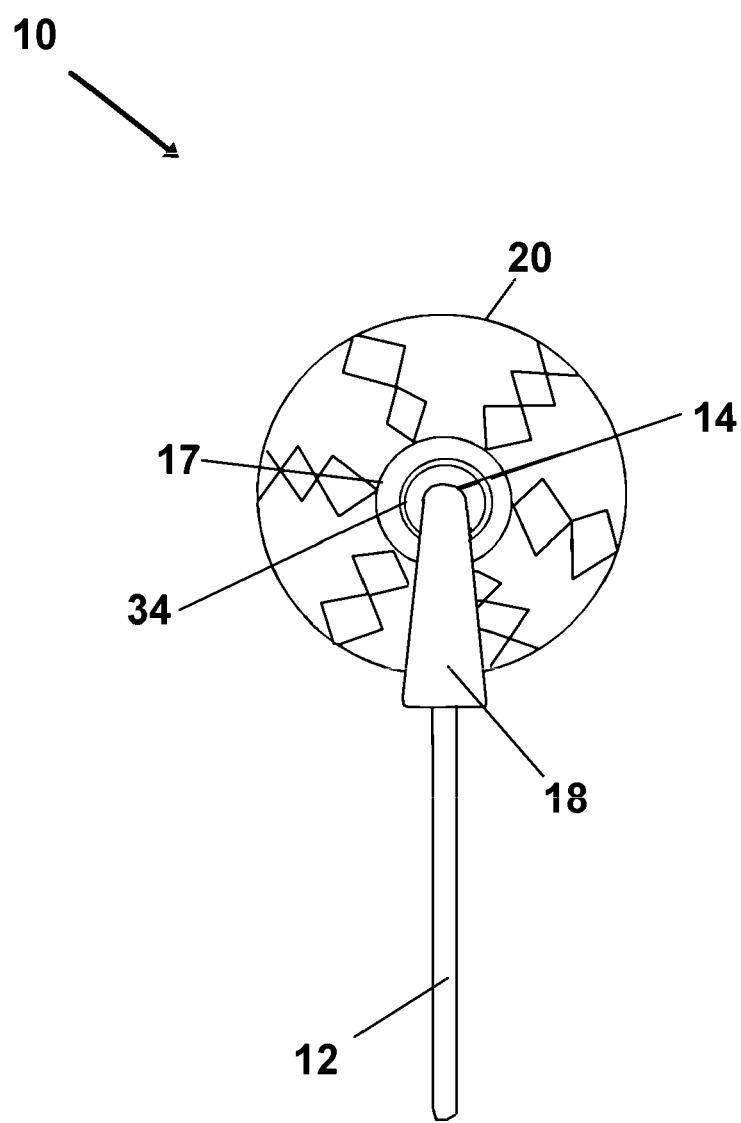
FIG. 2 shows a rear view of the device with confectionery.
Figure 4:
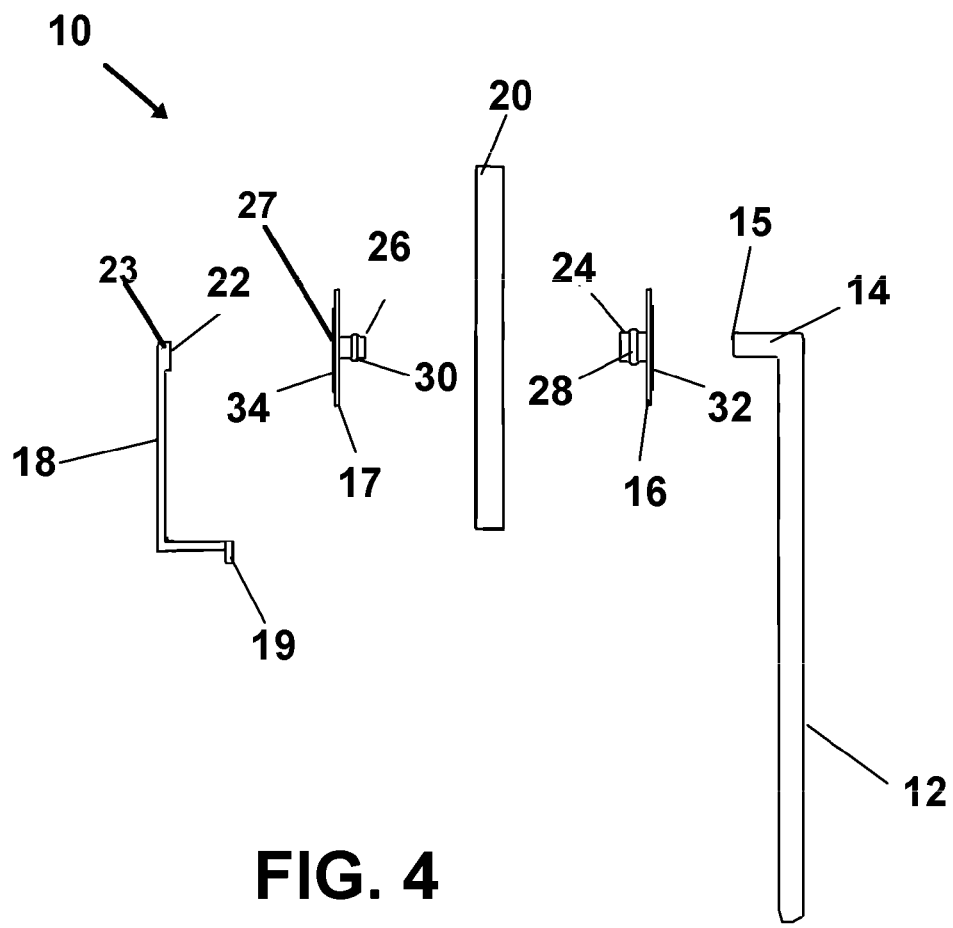
FIG. 4 is a side exploded view detailing the components of the device.
Figure 5:
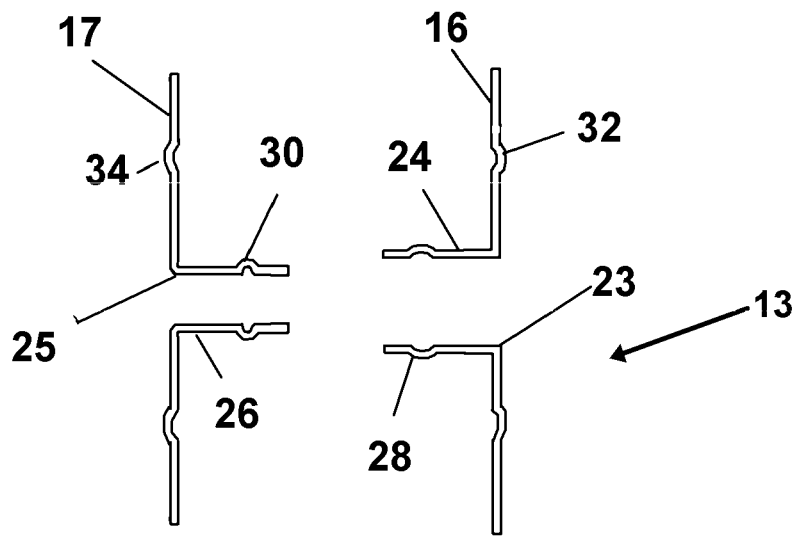
FIG. 5 is a side cross sectional view of the hub component of the device in the open mode.
Figure 6:
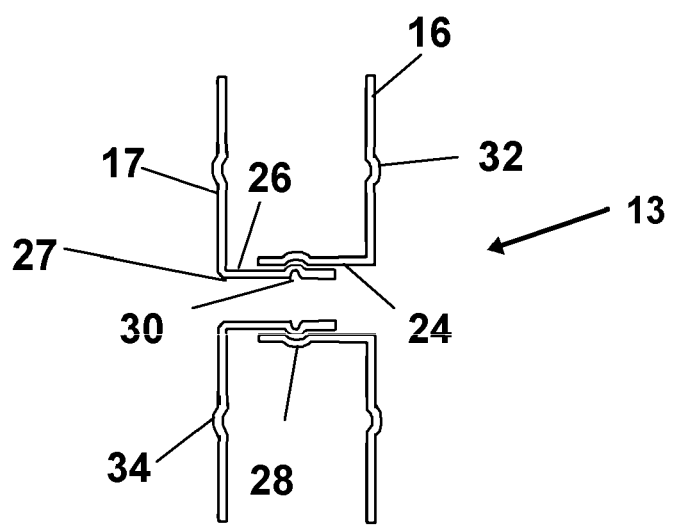
FIG. 6 is a side cross sectional view of the hub component of the device in the closed, as used mode.

Also depicted in FIGS. 1-2, is a first sidewall portion 16 of an optional but preferred hub component, shown in differing modes in FIGS. 4-6. The hub component is formed by first and second portions 16, 17, having a centered aperture 27.

Figure 3:
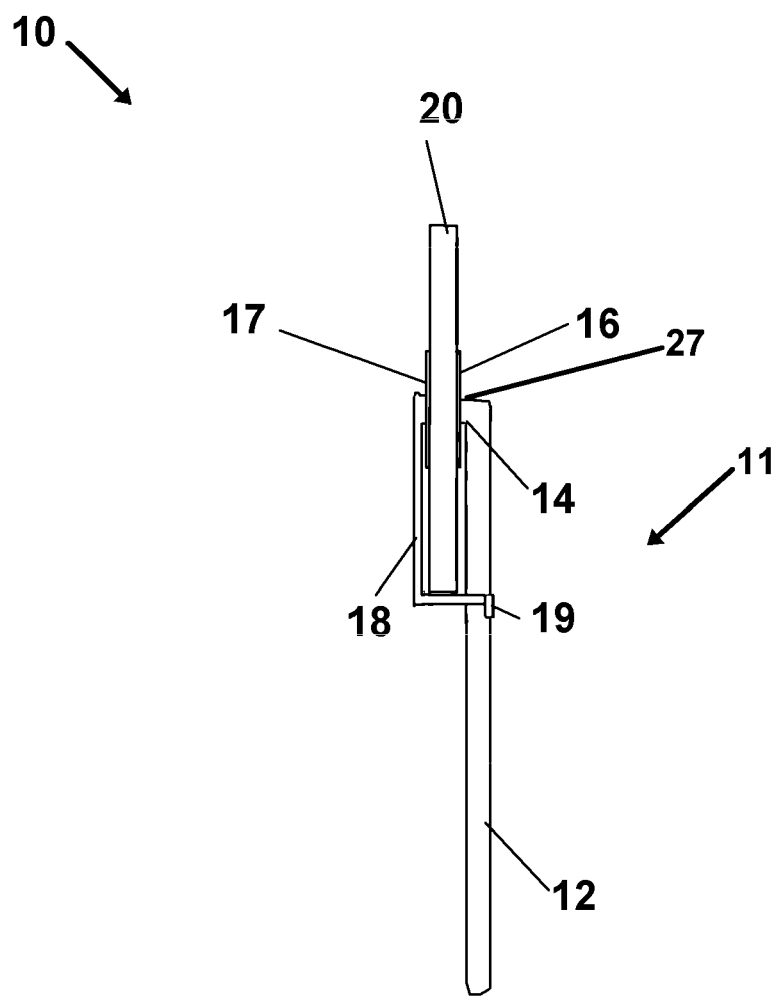
FIG. 3 shows a side view of the device with confectionery.
Figure 4A:
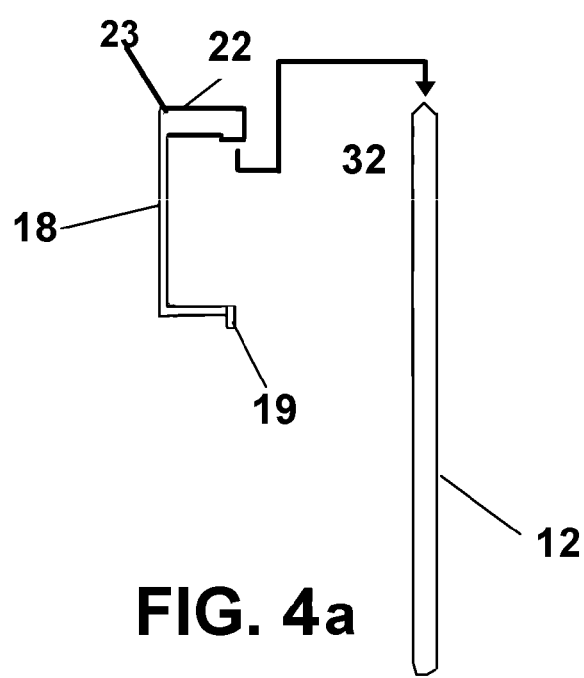
FIG. 4a depicts a mode of the device wherein the hub component engages over the distal end of the handle which is employable in all modes.

In the mode shown in FIGS. 2-4, a securement member 18 positions the cavity 22 of a collar 23 at one end, in position to engage upon the handle 12, and includes a pair of inwardly biased forks 19 as a means for biased circumferential engagement around the handle 12, near or just beyond the circumferential edge of the planar confectionery 20. The biased forks 19 are formed of resilient material such as a plastic like polyethylene, which has a memory and subsequent to being separated the forks 19 will bias toward their original positions.

The curved inner edge of the forks 19 are separated by a curved gap which biasly engage around the circumference of the slightly larger handle 12. The biasing of the resilient material forming the forks 19 provides an inward biasing frictional force thus positioning the base of the securement member 18 in a secure but removable engagement to the exterior of the handle 12. FIG. 1 shows there is no impediment to the consumer to licking the confectionery on the side opposite the securement member 18 at any point. On the side surface of the confectionery 20 where the securement member 18 is positioned, substantially all of the surface is still available for tongue contact. Especially important is the area of the confectionery 20 positioned past the engagement of the aperture 21 on the axis or axle 14 which is free to tongue and mouth contact and impartation of spinning to the confectionery 20 on both sides thereof.

As shown in FIG. 1a, the confectionery 20 in all members of the kit which are sized to engage the handle 12 and axis 14 or axle, employ a formed aperture 21 for coaxially aligned freewheeling rotational cooperative engagement with the axis for rotation 14 which provides an axle for rotation of a hub component. If employed, the hub component formed by the first 16 and second 17 portions are sized to engage through the confectionery aperture 21 and form a bearing aperture 27 therethrough sized to rotate on the axle provided by the axis of rotation 14. Enhanced freewheeling spinning of the confectionery 20 when rotated by the user's tongue and mouth can be achieved by forming the first and second portions from material such as teflon which has a low coefficient of friction. The hub is also preferred to prevent cracking and chipping of the aperture 21 of the confectionery 20 during spinning and repeated uses. However, the device 10 will function with just the aperture 21 in the confectionery 20.

FIG. 2 further shows the securement member 18 in a rear view of the device 10. The securement member 18 positions the axis of rotation 14, normal to the axis of the handle 12, and adjacent the planar sidewall area of the second portion 17 of the hub component. This will be further detailed in FIG. 4.

A side view of the device 10 in an as-used mode is depicted in FIG. 3 with exploded views in FIGS. 4 and 4a. In FIGS. 4 and 4a, the axle provided by the axis of rotation 14 is seen at the top or distal end of the handle 12 and proximal the rotating confectionery 20. The axis of rotation 14 can be part of or extending from the distal end of the handle 12, or as in FIG. 4a, may be part of the hub component 13 and engage the distal end of the handle 12.

In other modes of the device 10, the confectionery 20 may be engaged itself on the axle formed by the axis of rotation 14 or the confectionery 20 may be rotationally engaged on the axle formed by the axis of rotation 14 by the aperture formed in the engagement between the first portion 16 and second portion 17 defining the hub component 13 as shown. As shown in FIG. 4, the annular protrusions 32, 34 forming the sidewalls of the first and second portions 16, 17 of the hub component 13, can serve as bearings against the surface of the handle 12 and the securement member 18 and provide means to keep any sticky candy material from sticking thereon and impeding rotation. As depicted in FIGS. 1 and 1a, the confectionery 20 is preferably substantially planar and circular and formed to resemble a pinwheel. It is preferred that multiple confectioneries 20 are provided or available to users to engage upon the handle 12 allowing reuse and personalization by users to their taste.

FIGS. 4 and 4a, as noted, further show an exploded side view detailing the components of the device 10 and method of arrangement therein employed. When employed, the first portion 16 and second portion 17 of the hub component 13 employ substantially circular sidewalls 24 and 26 extending from a central aperture on the portions respectively for coaxially aligned cooperative engagement with the aperture 21 of the confectionery 20 and ultimately the axis of rotation 14.

The axle provided by the axis of rotation 14 which extends normal to, or at a substantially 90 degree angle to the distal end of the handle 12, may be formed by or extend from the handle 12 itself, or by a portion of the securement member 18 as shown in FIG. 4a, and engaging the distal end 15 of the handle 12. In use, the axle formed by the axis of rotation 14 engages through an operative cavity 22 of a collar 23 of the securement element 18.

As noted, easy but secure removable engagement of the securement member 18 to the handle is desired to allow for reuse and customization by users. One favored mode of this means for removable engagement is with a ball 21 (FIG. 7) engaging the cavity 22 of the collar 23 in a ball-in-socket type frictional engagement which is easy for a user to engage and disengage over time to change the confectionery if desired or to initially assemble it. The device 10 is preferably sold in stores where the user picks a confectionery 20 from a large group or a plurality of confectioneries 20, such as those in the small sampling of which is shown in FIG. 1a. Once a confectionery 20 is chosen, the wrapper (not shown but conventionally widely used on candy) may be removed and the user then assembles their own candy device 10.

This means of removable engagement to the axle provided by the axis of rotation 14, along with the biased engagement of the circumferentially engaged forks 19 frictionally around the exterior of the handle 12, provide a means for removable securement of the confectionery 20 to the securement member 18 to the handle 12. Once so secured, the confectionery 20 can be made to spin and continue spinning after tongue contact, while being eaten in a fashion similar to a sucker. The spinning continues and resembles a pinwheel.

Furthermore, removable engagement of the securement member 18 and confectionery 20 allows a user to simply remove and replace the existing confectionery 20 with another similarly formed confectionery 20 of an alternative flavor, shape, color as desired. For instance, a plurality of the planar confectioneries 20 might be provided in a kit such as depicted in FIG. 1a, with one assembleable handle 12 and axle provided by the axis of rotation formed on the handle 12 or the engageable securement member 18. The user would pick the version of confectionery 20 and assemble the device 10, and could easily change out the confectionery 20 later on with another from the kit.

The hub component 13 defined by the first portion 16 and second portion 17, which preferably is employed to engage with the confectionery 20 as described, provides an aperture 27 for a direct surface contact with the axle provided by the axis of rotation 14. This provides a means to rotate the confectionery 20 about the axle formed by the axis of rotation 14 without direct contact with the axle of the axis of rotation 14. Due to the stickiness often encountered with such confectionery it is beneficial to employ such a hub component 13 by eliminating direct contact of the confectionery with any relative moving surface. Alternatively, the confectionery may, upon forming, employ a plastic or similar material sleeve bearing (not shown) within a formed aperture 21 to achieve the same goal without a substantial hub component 13 as described and depicted.

Furthermore, additional radial protrusions 32,34 employed on the planar sidewalls of the first portion 16 and second portion 17 respectively provide a means to reduce contact with the securement element 18 and handle 12 as the confectionery 20 and hub component 13s rotate about the axis 14.

FIG. 5 shows a cross sectional view of the first portion 16 and second portion 17 prior to cooperative engagement to form a hub 13. Apertures 23,25 formed substantially center in the portions 16,17 respectively employ sidewalls 24,26 extending at a 90 degree angle to the planer walls of the portions. It is preferred that the aperture of one portion is less then that of the other to operatively engage one into another for joining the portions as depicted in FIG. 6. As depicted in the figure the aperture 25 of the second portion 17 is substantially less than the aperture 23 of the first portion 16, to achieve the goal of joining one portion into another forming the hub component 13.

It must be noted that this depiction was set forth for descriptive purposes only and should not be considered limiting in the manner that either portion may have apertures operatively sized to receive the other while achieving the goal as mentioned.

To maintain the engagement of the two portions 16,17 defining the hub component 13 in the as used mode, a radial protrusion 30 employed on the extending sidewall 24 of the second portion 17 engages a similar radial protrusion 28 in a biased engagement on the corresponding extending sidewall 26 of the first portion 16 as depicted in FIG. 6. Other means to maintain the operative engagement may similarly be employed such as adhesives while the depiction merely shows a particularly preferred mode. As can be seen, the apertures 23, 25 of the respective portions 16, 17 in the engaged positioned define the final through aperture 27 which is provided for a direct surface contact with the axle formed by the axis of rotation 14 and provides a means to rotate the confectionery about the axis of rotation 14.

Figure 7:
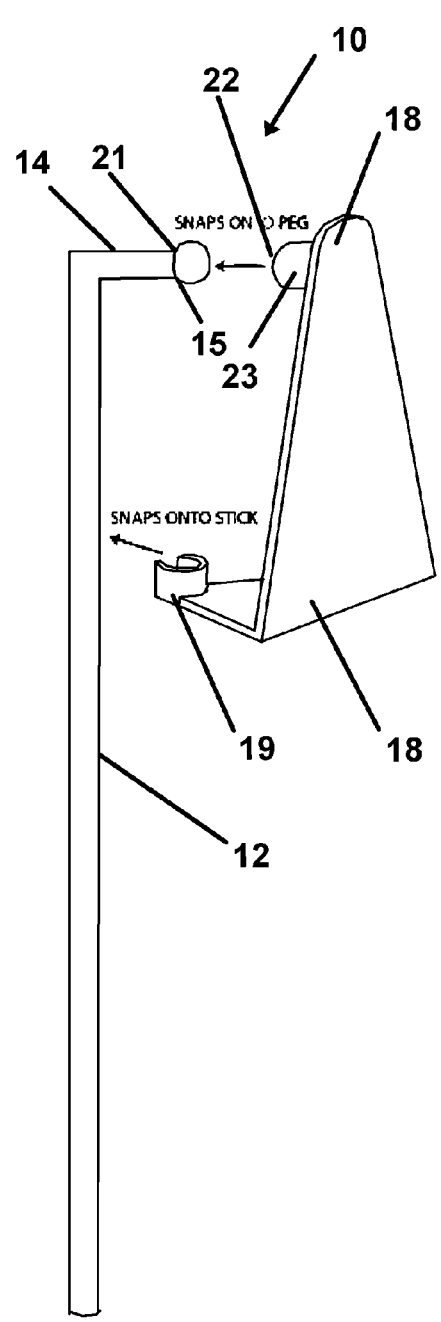
FIG. 7 depicts the easily engaged two component device showing it disassembled.
Figure 7A:
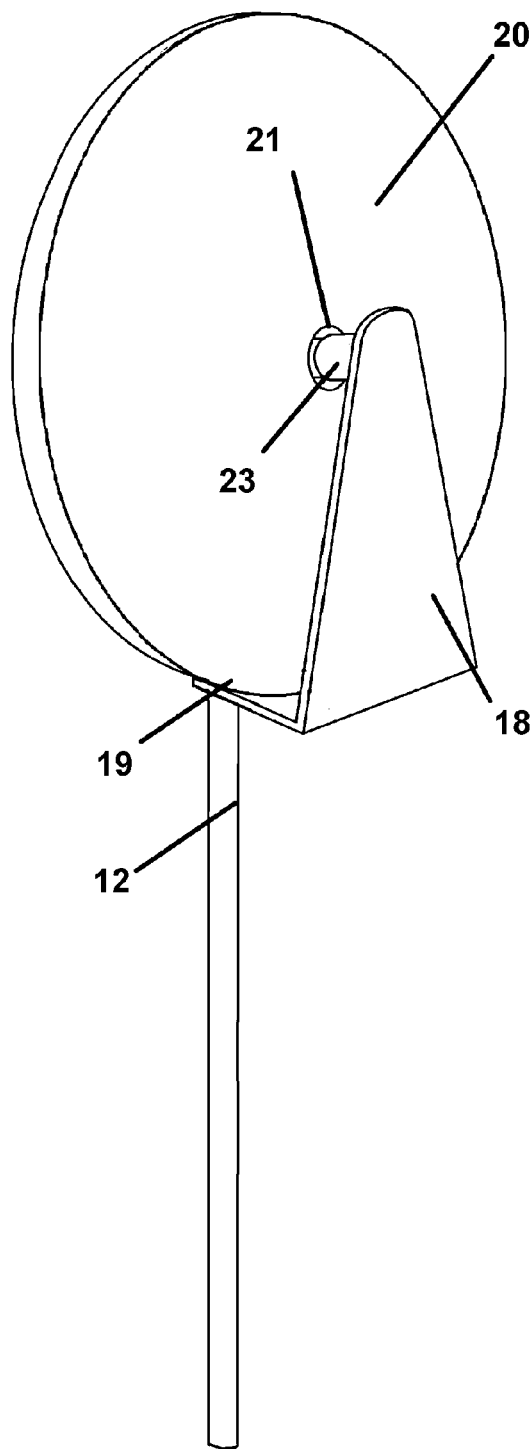
FIG. 7a depicts the two component device of FIG. 7 assembled with a hard candy planar wheel attached.

FIG. 7 shows an exploded view of yet another particularly preferred mode of the device 10 employing a ball component 21 disposed at the distal end 15 of the handle 12. In use the ball 21 provides a means for removable frictional engagement with a cavity 22 of the collar 24 of the securement member 18, similar to a ball in socket type engagement. As such a complete assembly as shown in FIG. 7a is provided by the cavity 22 frictionally engaged over the ball 21 and the forks or portions 19 biasly engaged over the exterior of the handle 12. This makes the handle component 12 easy for a user to self-assemble, and make their own spinning confectionery in a customized fashion.

In a particularly preferred mode, the user may purchase a handle component 12 wherein they may engage any of a plurality of available confectioneries 20 as desired. As an alternative the user may be provided with a plurality of confectioneries 20 in a kit along with the handle component 12 and thereby allowing the user to assemble the device 10 with the confectionery 20 of choice for the day, and reassemble with another confectionery 20 if desired later on.

Figure 8:
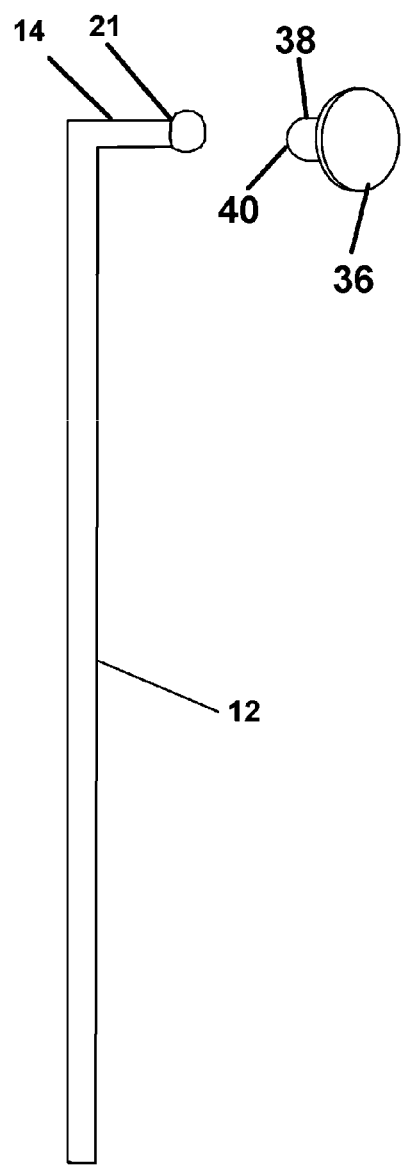
FIG. 8 depicts another preferred easily engaged two component device showing it disassembled.

FIG. 8 shows an exploded view of still yet another particularly preferred mode of the device 10 employing a circular planar securement component 36. The securement component 36 includes a collar 38 extending substantially perpendicular therefrom and having a formed cavity 40 therein, similar to the cavity 22 of the collar 23 of the previously disclosed securement element 18. The currently shown securement component 36 requires less material to form compared to the previously disclosed element 18 and is therefor more cost effective and easier to assemble.

Figure 8A:
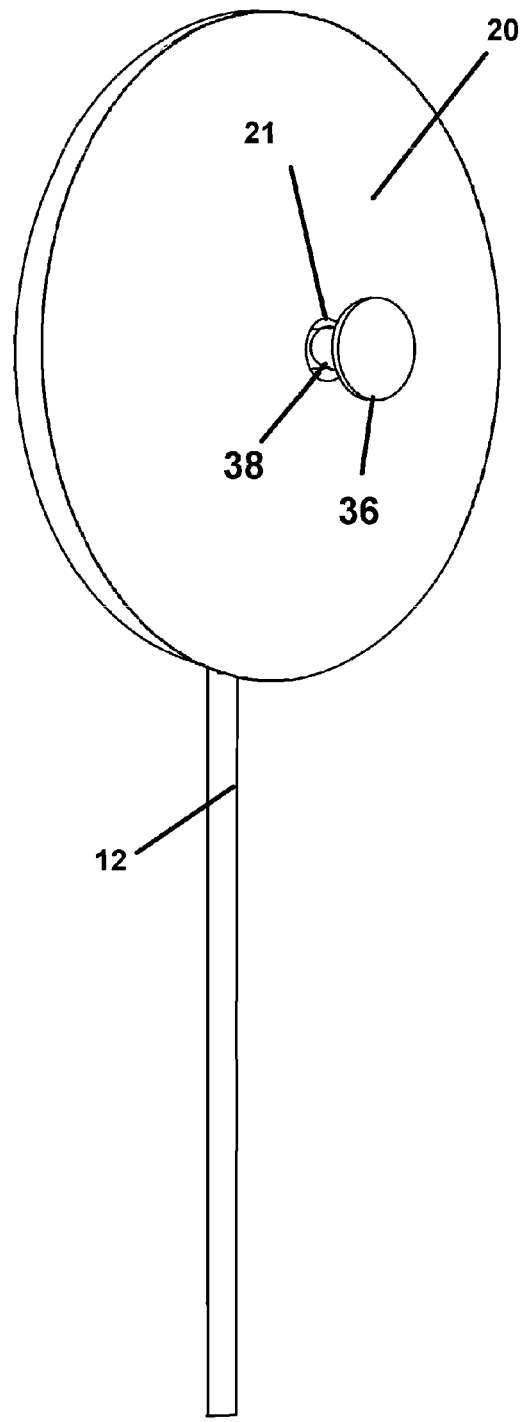
FIG. 8a depicts the two component device of FIG. 8 assembled with a hard candy planar wheel attached.

Secured engagement of a confectionery 20 to the axle formed by the axis of rotation 14 is provided by the ball component 21 disposed at the distal end 15 of the handle 12 frictionally engaged within the cavity 40 of the securement component 36. As such a complete assembly as shown in FIG. 8a is provided wherein the aperture 21 of the confectionery 20 is engaged over the axle formed by the axis of rotation 14 and the cavity 40 of the securement component 36 is frictionally engaged over the ball 21 in secured engagement. It must be noted however, that although not shown the currently disclose preferred mode of the device may additionally employ the hub component 13 described previously as needed to reduce surface contact of the potentially sticky confectionery with securement component 36, handle 12, or axis of rotation 14.

Figure 9:
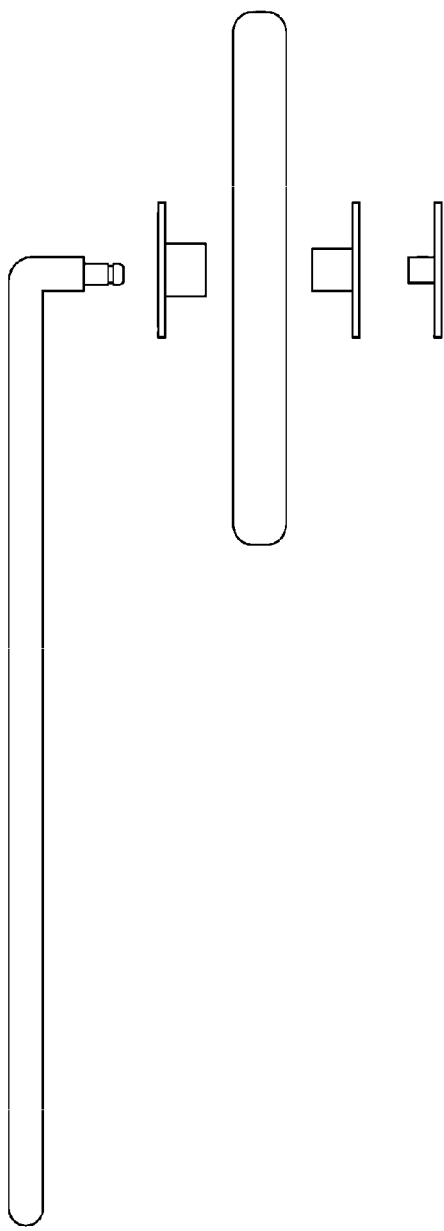
FIG. 9 depicts an exploded view of the device wherein engageable hub components are positionable through a center aperture of the hard candy wheel to enhance spin.
Figure 10:
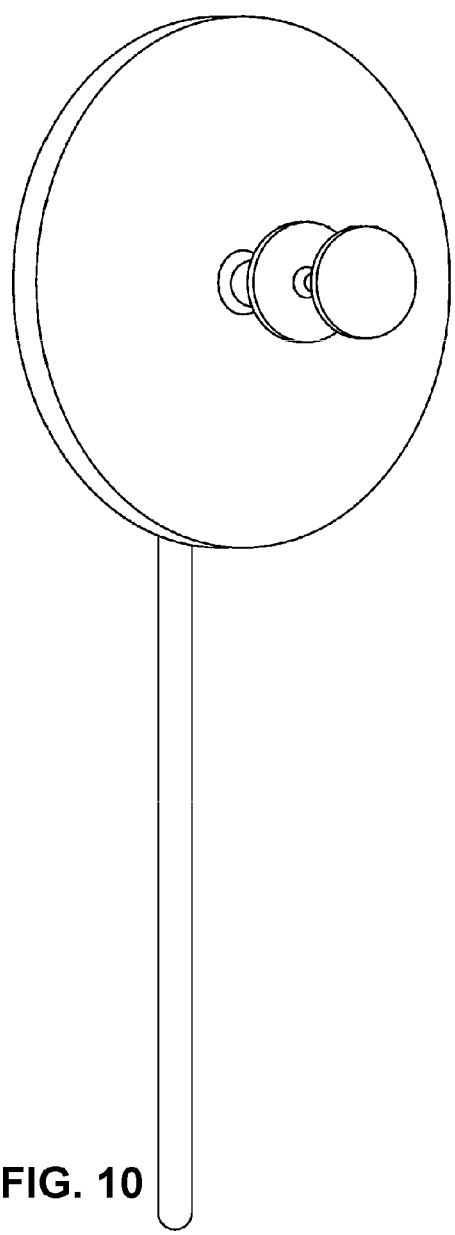
FIG. 10 depicts the device of FIG. 9 in a perspective view showing the internal engagement of an annular portion of the securement component through an aperture in the second portion of the hub component.

FIGS. 9-10 depict a mode of the device 10 wherein a hub component 13 is formed of a first portion 16 and a second portion 17. In this mode annular portions 31, having respective apertures running therethrough extend away from a planar sidewall 29 of each of the first portion 16 and second portion 17 of the hub component 13. The respective apertures also communicate through the respective sidewall 29 of each of the two portions of the hub component 13.

The internal circumference of the aperture running through the annular portion 31 and sidewall 29 the second portion 17 is sized just slightly larger than a circumference of a race 35 formed at the distal end of the axis 14 positioned on the handle 12 and running along a line perpendicular thereto. An endwall 37 of the annular portion 31 of the second portion 17 extends to an exterior circumference of the annular portion 31 of the second portion 17 and with the confectionery 20 rotationally engaged as in FIG. 10, runs upon a vertical wall 41 extending between the circumference of the race 35 and the circumference of the axis 14. I has been found through experimentation that configuring the hub component 13 in engagement with the confectionery 20 wheel, and with the race 35, and abutting the vertical wall 41, yields a much sturdier and more easily and evenly rotated confectionery wheel 20 than in other modes.

A securement component 36 is employed to engage over a ball 21 shaped distal end of the race 35 in a frictional engagement by forming the securement component 36 of elastic material which will expand along an axial passage of the securement component 36 and over the ball 21 shaped end which has a recess 33 adjacent thereto to enhance the stretched frictional enragement of the securement component 36, over the ball 21 portion. The interior circumference of an aperture running through the annular portion 31a extending from the sidewall 29 of the securement component 36, is equal to preferably just slightly smaller than the internal circumference of the aperture communicating through the second component 17 of the formed hub component 13 which provides for a smooth and non-wobbly rotation of a wheel shaped confectionery 20 engaged to the handle 12. When sold as a kit where the user will be able to position any of a plurality of wheel shaped confectioneries 20 to a handle 12, the confectionery 20 can have the hub component 13 already engaged therethrough, and provide a new securement component 36 or allow the user to use the one they have.

Figure 11:
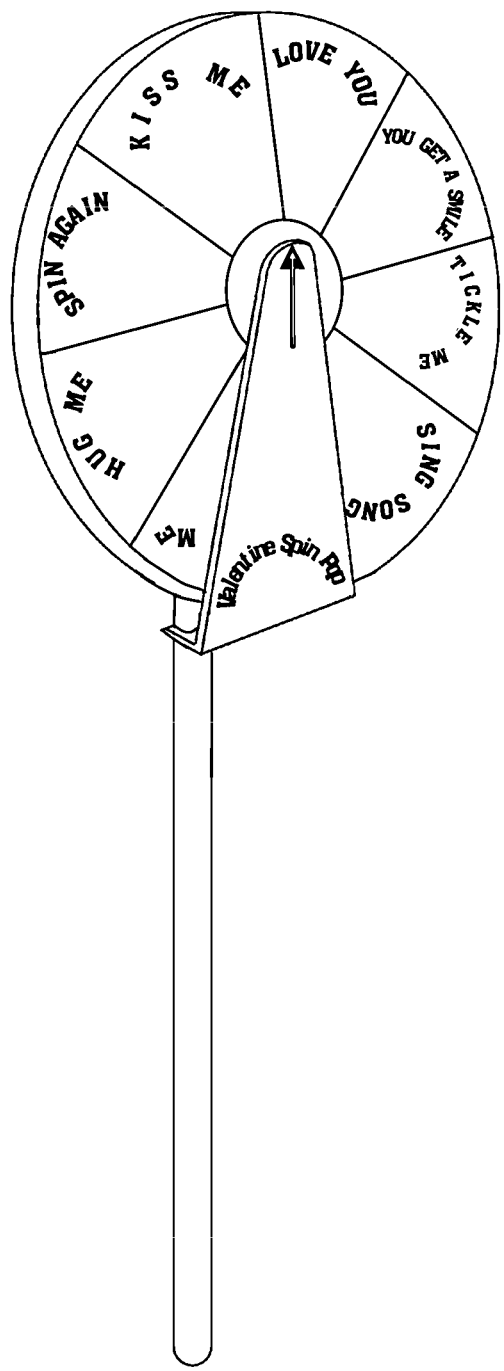
FIG. 11 shows a mode of the device wherein indicia is located on one, or both planar sides of the candy wheel which is employable as a spinning wheel game for one or more players.

Depicted in FIG. 11 is a particularly preferred mode of the device 10 wherein indicia 50 is located in triangular sections, on one, or both planar side surfaces 52 of the hard candy wheel confectionery 20. The indicia 50 may be formed into the confectionery 30 or applied to the side surface 52 or be engaged as a label on the side surface 52 or other means. A pointer 54 is positioned adjacent one or both side surfaces 52.

In this mode of the device 10 of FIG. 11, the device 10 can be employed as a spinning game where a user will spin the wheel formed by the confectionery 20. When a section containing indicia 50 aligns with the pointer 54, the user may perform a task identified by the indicia 50, score points, or play another game where spinning the wheel shaped confectionery 20 to an landing of a section 53 aligned with a pointer 54, will provide the game playing component. The indicia 50 is shown as text but may also be images, colored sections, or other indicia appropriate to the play of the game.

As depicted in FIG. 11 is a mode of the device 10 wherein the indicia 50 is adapted for a holiday such as Valentine's day, and spinning of the confectionery 30 can be employed to provide to play a spinning game by providing a message to a person, or a task, depending on where a triangular section 53 bearing a particular picture, text, or other indicia 50 aligns with the marker 54 when the wheel shaped confectionery 20 is rotated.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A hand-held candy apparatus, comprising:
a handle extending along an axis between a first end adapted for gripping by the fingers of a user, and a distal end opposite said first end;
an axle positioned at or adjacent to said distal end of said handle, said axle extending to a distal end along an axle axis;
a substantially planar confectionery having a circumference;
an aperture centered in said confectionery and communicating between a first side and second side thereof;
said aperture having an aperture diameter slightly larger than a diameter of an enragement portion of said axle;
said confectionery in a rotational engagement of said aperture encircling said engagement portion of said axle; multiple sections of indicia positioned on at least one of said first side or said second side of said confectionery;
a marker adjacent to said confectionery;
said confectionary in said rotational engagement adapted for spinning by a tongue or mouth of a user holding said first end of said handle; and a positioning of one of said multiple sections of indicia in an alignment with said marker upon a cessation of said spinning, defining a message or a task to be performed.

2. The hand-held candy apparatus of claim 1 wherein said rotational engagement is a removable engagement of said aperture encircling said engagement portion of said axle held in position by an engagement component attached to said distal end of said of said axle, whereby removal of said engagement component enables a sliding said confectionery off said distal end of said axle.

3. The hand-held candy apparatus of claim 1 wherein said aperture centered in said confectionery and communicating between a first side and second side thereof is positioned within a hub engaged to said confectionery.

4. The hand-held candy apparatus of claim 2 wherein said aperture centered in said confectionery and communicating between a first side and second side thereof is positioned within a hub engaged to said confectionery.

5. The hand-held candy apparatus of claim 3 wherein engagement portion of said axle is a race formed at said distal end of said axle.

6. The hand-held candy apparatus of claim 4 wherein engagement portion of said axle is a race formed at said distal end of said axle.

* * * * *